United States Patent Office.

WESLEY W. BARNES, OF NEW YORK, ASSIGNOR TO BENJAMIN C. KIRK AND THOMAS T. TABER, BOTH OF GLEN COVE, AND WALSINGHAM A. MILLER, OF OYSTER BAY, NEW YORK.

PLASTIC COMPOSITION FOR INSULATING ELECTRIC WIRES, &c.

SPECIFICATION forming part of Letters Patent No. 371,406, dated October 11, 1887.

Application filed March 10, 1887. Serial No. 230,430. (No specimens.)

*To all whom it may concern:*

Be it known that I, WESLEY W. BARNES, a citizen of the United States, and a resident of the city of New York, in the county of New York and State of New York, have invented certain new and useful Improvements in Plastic Compositions; and I do hereby declare that the following is a full, clear, and exact description of the invention, which will enable others skilled in the art to which it appertains to make and use the same.

My invention has relation to a new and useful plastic composition, which is adapted to a variety of uses in the arts and manufactures. Among some of these uses may be mentioned as examples the insulating of electric wires or conductors—such as telegraph-wires, telephone-wires—whether used in the open air or in under ground or submarine conduits or cables, the insulating of such parts of electrical machinery and motors as require to be insulated, the coating or covering, for purposes of protection, of railroad-ties, telegraph-poles, fence-posts, piles, and all other articles of wood or metal which require a protective coating or covering against rot or the attack of the sea-worm. My composition may also be used in the construction of pavements, and in the manufacture of tiles, plaques, statuary, memorial tombstones, and almost any other purpose within the scope of works of art. In fact, the various purposes for which my invention is adapted are so numerous that their enumeration would require a volume.

This composition consists of a combination of mineral carbon and crude sulphur thoroughly pulverized to an impalpable dust or powder, and then mixed and fused by heat. The simplest way of mixing and preparing these ingredients is to take of the best hard coal obtainable—such as a high grade of anthracite, for example—fifty parts (more or less) and about ten parts (more or less) of the best crude sulphur. The mineral coal should contain not less than eighty per cent. of fixed carbon. These ingredients are reduced by proper machinery separately to a very fine impalpable powder, after which they are thoroughly mixed in about the proportions above stated and fused in an iron pot or any other suitable vessel, by gradually raising the heat to which the mixture is subjected until it attains the proper consistency for pouring it into molds or for adapting it for any other purpose for which it may be intended. If desired, the composition may at this stage be molded into blocks or cakes of suitable size, which may be stored away for future use and remelted as occasion requires by a heat rarely exceeding 400° Fahrenheit.

The fluidity of this composition may be changed at will simply by properly regulating the heat to which it is subjected while it is being fused or remelted, so as to fully meet the purposes for which it is intended. It may be cast in the making of plaques or tiles, for example, so as to form a very hard and stone-like substance adapted to receive a very high degree of polish, yet so fluid in pouring it that it will reproduce the finest texture. Again, by proper manipulation of the compound while it is subjected to the action of heat, it may be transformed into a viscid or sticky substance, possessing when it dries a great degree of elasticity, flexibility, and tenacity, so that it may be used for covering cables or electric wires without danger or liability of breaking or becoming brittle. Again, by still further increasing the heat it may be rendered so fluid that it will penetrate into the pores of wood or other porous material for which it is to serve as a preventive of decay; or it may, by means of a brush or other suitable implement, form a coating for metal, terra cotta, brick, or, in fact, any material whatever, owing to its great tenacity and coherency to other substances. In whatever form this material is used it can be made to receive a high polish.

When molded into bricks or blocks of suitable size, this material may be used as bricks for building purposes, or as blocks for pavement purposes; or it may be laid into pavements in substantially the same manner as asphalt or cement pavements.

Having thus described my invention, I claim and desire to secure by Letters Patent of the United States—

1. A plastic compound or composition composed of a mixture of mineral coal and sulphur fused in about the proportions set forth.

2. A plastic compound or composition composed of about fifty parts of mineral coal containing not less than eighty per cent. of fixed carbon and reduced to an impalpable powder, and about ten parts of crude sulphur in the form of an impalpable powder, said two ingredients being thoroughly mixed together and then fused by heat, substantially as set forth.

3. An insulating compound or composition composed of a mixture of mineral coal and sulphur fused in about the proportions set forth, and reduced by heat to the proper consistency to adapt it for the special purpose or purposes for which it is intended.

4. As an article of manufacture, blocks or cakes of any desired size and shape consisting of a compound or composition composed of a mixture of mineral coal and sulphur fused in about the proportions set forth and cast in suitable molds.

5. The method or process of producing casts, which consists in mixing together and fusing mineral carbon reduced to an impalpable powder, and sulphur, also in the form of an impalpable powder, the said ingredients being pulverized separately, then fused by heat, and then poured into the molds from which the casts are to be made, substantially as set forth.

In testimony that I claim the foregoing as my own I have hereunto affixed my signature in presence of two witnesses.

WESLEY W. BARNES.

Witnesses:
LOUIS BAGGER,
AUGUST PETERSON.